United States Patent
Salvaudon

(10) Patent No.: US 7,994,939 B2
(45) Date of Patent: Aug. 9, 2011

(54) SAFETY SYSTEM FOR AN AIRCRAFT PROVIDED WITH AT LEAST ONE FUNCTIONAL DEVICE USING PRIMARY ENERGY

(75) Inventor: Gilles Salvaudon, Paris (FR)

(73) Assignee: Dassault Aviation, Paris (FR)

( * ) Notice: Subject to any disclaimer, the term of this patent is extended or adjusted under 35 U.S.C. 154(b) by 760 days.

(21) Appl. No.: 11/819,065

(22) Filed: Jun. 25, 2007

(65) Prior Publication Data
US 2008/0001781 A1    Jan. 3, 2008

(30) Foreign Application Priority Data

Jun. 23, 2006  (FR) ...................................... 06 05672

(51) Int. Cl.
*G08B 21/00* (2006.01)
*F42C 15/34* (2006.01)
(52) U.S. Cl. ........................ 340/945; 102/254
(58) Field of Classification Search .......... 340/945–983; 102/254, 275.7, 247; 244/137.1, 137.4
See application file for complete search history.

(56) References Cited

U.S. PATENT DOCUMENTS

| 3,036,852 | A |   | 5/1962 | Mullison |             |
|-----------|---|---|--------|----------|-------------|
| 3,712,170 | A | * | 1/1973 | Campagnuolo et al. | 89/1.814 |
| 3,826,954 | A | * | 7/1974 | Neher | 361/189 |
| 3,960,051 | A | * | 6/1976 | Hunt | 89/1.8 |
| 4,013,012 | A | * | 3/1977 | Giattino | 102/216 |
| 4,040,334 | A | * | 8/1977 | Smethers, Jr. | 89/1.804 |
| 4,160,417 | A | * | 7/1979 | Fowler | 102/221 |
| 4,372,212 | A | * | 2/1983 | Hoelzen et al. | 102/264 |
| 4,479,417 | A |   | 10/1984 | Billard et al. | |
| 4,572,053 | A | * | 2/1986 | Sosnowski et al. | 89/1.51 |
| 5,042,357 | A | * | 8/1991 | Schaff et al. | 89/1.55 |
| 5,092,542 | A | * | 3/1992 | Ellis et al. | 244/137.4 |
| 5,131,328 | A | * | 7/1992 | Chan | 102/229 |
| 5,375,525 | A | * | 12/1994 | Greenslade et al. | 102/254 |
| 6,860,206 | B1 | * | 3/2005 | Rudakevych et al. | 102/206 |

FOREIGN PATENT DOCUMENTS

EP      0 067 732 A2    12/1982

* cited by examiner

*Primary Examiner* — Benjamin C Lee
*Assistant Examiner* — Sigmund Tang
(74) *Attorney, Agent, or Firm* — Jacobson Holman PLLC

(57) ABSTRACT

A safety system in which each functional device (such as a payload suspended from a pylon of a combat aircraft or an escape chute of a civil aircraft) includes at least one removable barrier making it possible to arm and disarm the functional device depending on whether the aircraft is in flight or on the ground. The removable barrier is electrically operated and the system also includes a control mechanism placed inside the aircraft in order to electrically switch the barrier between its armed and disarmed positions.

8 Claims, 3 Drawing Sheets

SAFETY SYSTEM FOR AN AIRCRAFT PROVIDED WITH AT LEAST ONE FUNCTIONAL DEVICE USING PRIMARY ENERGY

CROSS-REFERENCE TO RELATED APPLICATIONS

This application is based on French Patent Application No. 06 05672 filed Jun. 23, 2006, the disclosure of which is hereby incorporated by reference thereto in its entirety, and the priority of which is hereby claimed under 35 U.S.C. §119.

BACKGROUND OF THE INVENTION

1. Field of the Invention

The invention relates to a safety system for an aircraft provided with functional devices using primary energy.

2. Description of the Prior Art

In civil and military aircraft, certain functional devices use primary energies. "Primary energy" means energy that does not originate from the general power supply system of the aircraft (supplied as a last resort by the engines of the latter), is but from standalone energy sources specially associated with the functional devices in question.

Amongst the primary energy sources frequently used can be cited those operating by pyrotechnics, by high-pressure compressed gases or by high-power high-frequency electromagnetic energy.

In France, such pyrotechnic-based functional devices are governed by a regulation published under reference number C50.SEC.19561 and by standard No. GAM-DRAM-01.

Such energy sources, when they are used in abnormal conditions, may cause risks to their environment and in particular to the ground personnel.

Examples of functional devices of this type are, for example;

on military aircraft: missile-launchers, missile support pylons, bomb-launchers, decoy launchers, emergency arresting hooks, ejector seats, etc.

and on civil aircraft; escape chutes, self-protection decoy launchers, etc.

To prevent the unintentional activation of these functional devices, it is a known practice to provide them with safety means in order to ensure that, on the ground, the primary energies cannot be triggered unintentionally and to prevent the functional devices being activated. These safety means are always operated manually by ground personnel (particularly in the case of military aircraft) or by cabin personnel (particularly for the escape chutes of civil aircraft).

Usually, these safety means act in two ways: on the one hand by direct action by providing a physical disconnection of the control lines of the primary energy intended to actuate the functional device, and on the other hand by mechanically blocking any movement that might be due to the triggering of the primary energy.

An example of a functional device provided with such a conventional safety means is a pylon under a combat aircraft, this pylon being fitted with an assembly for ejecting a payload and comprising, for example, two pyrotechnic charges. FIGS. 1 and 2 of the appended drawings illustrate this example.

A payload such as a missile (not shown) is designed to be suspended from hooks CR1 and CR2 provided under a pylon P (represented on a support carriage in FIG. 1) attached beneath the wing of an aircraft. The hooks CR1 and CR2 may be opened in flight thanks to the presence of two pyrotechnic charges C1 and C2 positioned respectively in housings forming explosion chambers making it possible to transfer the energy of the gases originating from the explosion to ejection pistons (not visible) and the hooks CR1 and CR2 in order to release the payload.

For the purpose of preventing any undesirable operation on the ground of this functional device, two independent removable safety barriers B1 and B2 are provided one of these barriers B1 consisting of a door designed, in flight, to provide the electric contact allowing the firing of the charges C1 and C2 and, on the ground, by opening it and retaining it in the open position, to physically interrupt the power supply of the system of priming the pyrotechnic charges C1 and C2. The door is opened or closed by the ground personnel usually without the aircraft pilot being able to intervene or perceive the closed or open state.

This first barrier B1 is called "electric safety". In the open position, the door has an unambiguous visual appearance for the ground personnel with regard to the safe state of the priming system that is associated therewith.

The second barrier B2 consists of a pin making it possible, by its insertion into a housing provided for this purpose, to block all mechanical movement in the functional device, even if the pyrotechnic charges C1 and C2 should be accidentally primed. The barrier or pin B2 is associated with a bright-colored flag (bright orange or red, for example) marker FC making it possible to visually notice its presence. It is also inaccessible to the pilot installed in the cockpit and cannot be observed by the latter.

During the preparation of the aircraft for take-off, the ground personnel or, where necessary, the cabin personnel must render such barriers inoperative by "removing" them in order to arm the functional devices that the aircraft is fitted with and conversely, after the landing of the latter, the same personnel must disarm the functional devices by putting the barriers in place again.

Both military and civil aircraft may be fitted with many primary-energy functional devices. For example, on a military aircraft it is possible routinely to find up to ten or even more, while on a jumbo airliner for example, this number may be even much greater in particular because of the large number of emergency exits that must be fitted with chutes to be armed before take-off and disarmed after landing.

The result of this is a major workload and responsibility for the personnel and a not inconsiderable risk of errors that may cause a potential danger on the ground in the event of a malfunction of a primary energy source (forgetting to put in place a barrier after landing) and in flight a malfunction of a functional device (forgetting to remove a barrier before take-off).

SUMMARY OF THE INVENTION

The object of the invention is to provide a safety system of the type indicated above, eliminating human intervention to a large degree for the arming and disarming of the functional devices.

The subject of the invention therefore is a safety system for an aircraft provided with at least one functional device using primary energy, each functional device comprising at least one removable barrier making it possible to arm and disarm the functional device depending on whether the aircraft is in flight or on the ground, this system being noteworthy in that said removable barrier is electrically operated and in that the system also comprises control means placed inside the aircraft in order to electrically switch said barrier between its armed and disarmed positions.

Thanks to these features, the safety system may be controlled from inside the aircraft particularly from the cockpit so that the service personnel, whether they be on the ground or in the cabin, do not have to arm or disarm the removable barrier. The result of this is increased safety, particularly due to the fact that the arming and disarming are carried out at the initiative of the aircraft pilot.

According to another advantageous feature of the invention, said removable barrier comprises an electrically operated device for electrically disconnecting the signal that makes it possible to release the primary energy of the functional device.

In addition or as an alternative, the safety system according to the invention may also comprise a removable barrier with an electrically operated mechanical blocking device blocking the kinematics of the functional device when the primary energy is released.

When two electrically operated barriers, one for electrical disconnection and the other for mechanical blocking, are present at the same time for one and the same functional device, a safety redundancy is advantageously obtained.

According to yet further advantageous features,
  said removable barrier also comprises manual operating means for arming or disarming the functional device without actuating its electrical operation;
  each removable barrier comprises a two-color visual indicator for the visual indication of its armed and disarmed states in its immediate environment;
  said control means comprise two independent control channels for said removable barrier whereof the first is arranged to allow the arming or disarming of said functional device as a function of a signal of presence on the ground of said aircraft and whereof the second is arranged to allow the arming and disarming of said functional device as a function of predetermined criteria, independent of those of the first channel and consolidating the instructions of the latter.

When the aircraft comprises a plurality of functional devices, the invention may further provide the following advantageous dispositions:
  said control means are centralized in the cockpit of the aircraft and comprise a single electric control member allowing the collective arming or disarming of all the functional devices of the aircraft;
  viewing means are provided close to said single control member to provide a visual report of the armed and disarmed state of said functional devices;
  said viewing means comprise as many indicator lamps as there are functional devices In the aircraft to report individually on their armed and disarmed states;
  the armed and disarmed states of said functional devices are applied to an AND function block connected to a single indicator lamp in order to be able to report collectively the armed and disarmed states of all these functional devices.

BRIEF DESCRIPTION OF THE DRAWINGS

Other features and advantages of the invention will appear during the following description of a preferred embodiment of the invention, given solely as an example and made with reference to the appended drawings in which.

DETAILED DESCRIPTION OF THE PREFERRED EMBODIMENTS

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Figure 1:
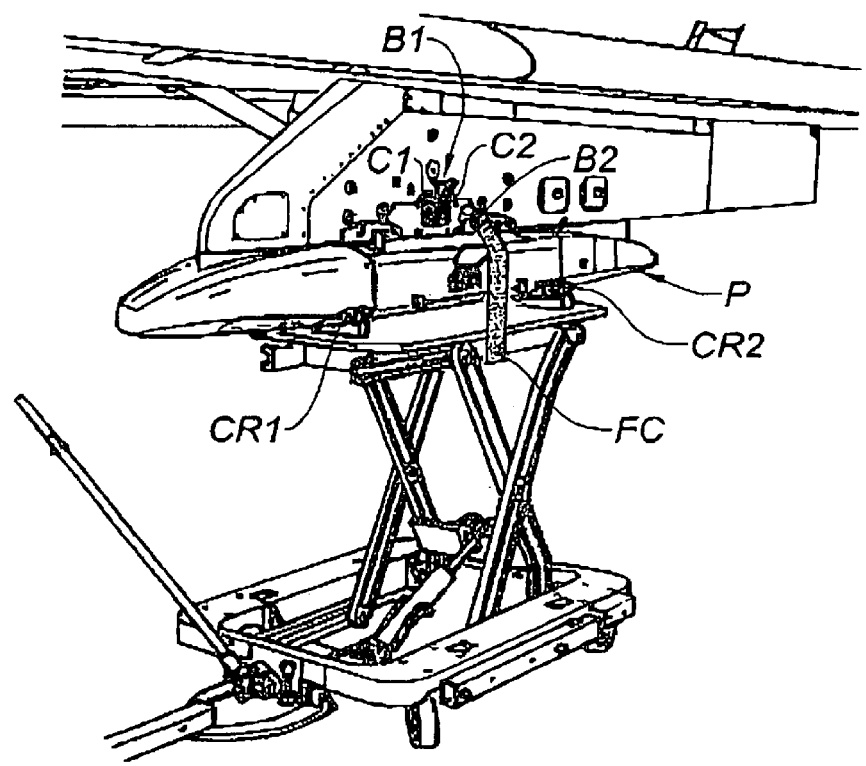
FIGS. 1 and 2 already described show a primary-energy functional device with its safety means designed according to the prior art.
Figure 2:
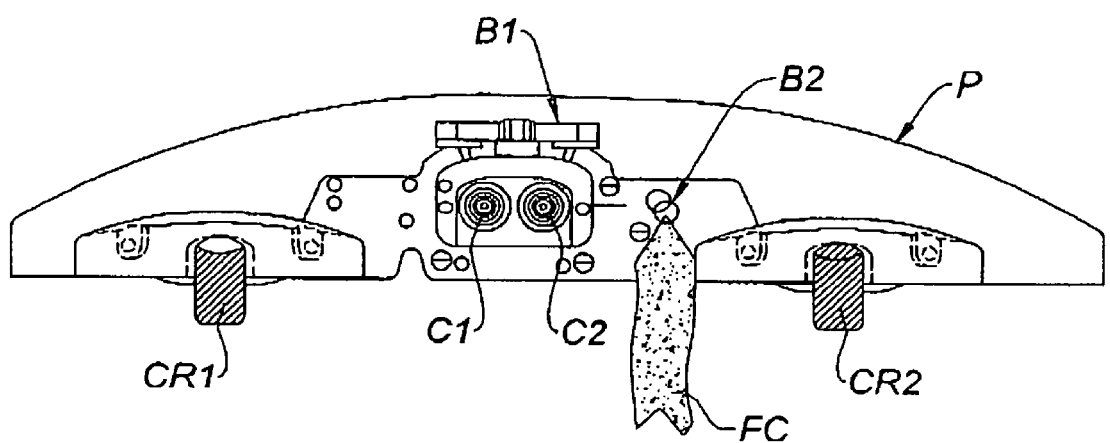
Figure 3:
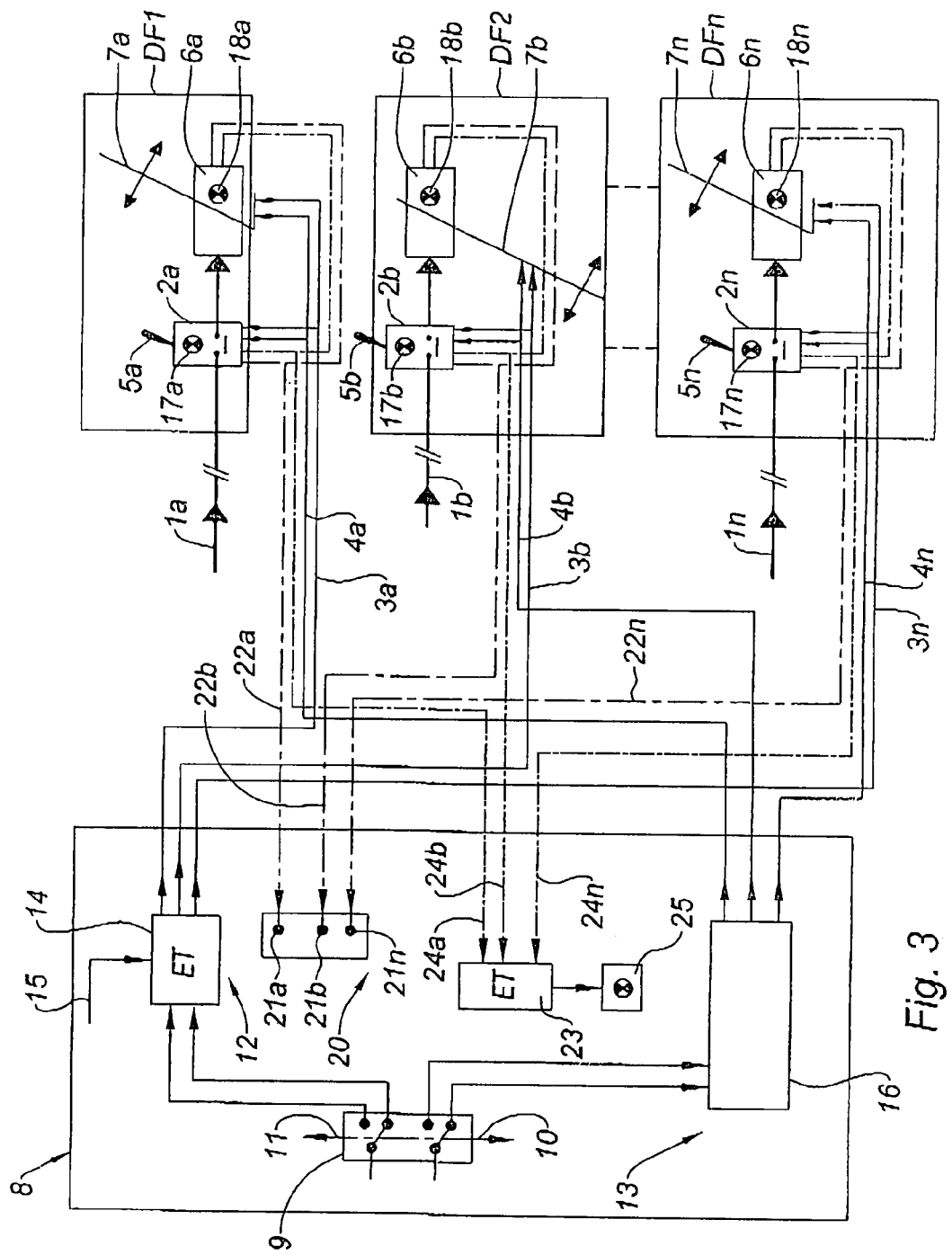
FIG. 3 is a simplified diagram of a general safety system according to the invention covering all the functional devices with which an aircraft can be fitted.

In the exemplary embodiment of the safety system represented in FIG. 3, it involves an aircraft having n primary-energy functional devices DF1 to DFn. These functional devices may be those already mentioned in the preamble.

Each functional device DF1 to DFn comprises the mechanisms necessary to perform its assigned function, under the action of the primary energy (for a chute, the pyrotechnic device for inflating the slide, for example). The primary energy may be delivered after activation of a control line, $1a$ to $1n$, specific to each functional device.

However, each of these control lines $1a$ to $1n$ may be physically disconnected by a first removable barrier that here is an electrically operated disconnection device, $2a$ to $2n$, incorporated into the corresponding functional device. Preferably, each of these "electric" disconnection devices is formed of a power relay with two stable positions comprising an electric motor for each position and being able to be actuated toward each position, either by an electric control, or by a manual control.

An electric control may be applied to each electric disconnection device $2a$ to $2n$ by means of one or other of two control lines, $3a$ to $3n$ or $4a$ to $4n$ respectively. The manual control may be performed thanks to an appropriate mechanism actuated by a lever $5a$ to $5n$ that can be accessed on the corresponding functional device by the personnel on the ground or in the cabin depending on the case.

Each functional device also comprises a second removable barrier formed from an electrically operated mechanical blocking device, $6a$ to $6n$, designed to block its kinematics which, to perform its function, must be driven by the primary energy. As a preferred example, it may involve electrically operated cams with two stable positions, one blocking and the other unblocking the kinematics. These cams may be actuated either electrically by means of a control traveling over the respective lines $3a$ to $3n$ or $4a$ to $4n$, or manually by a respective lever $7a$ to $7n$ that can be accessed on the corresponding functional device by the service personnel, such as the levers $5a$ to $5n$ of the disconnection devices $2a$ to $2n$.

The safety system according to the invention also comprises centralized switching means indicated by the rectangle 8 in FIG. 3. It comprises a general control 9 situated in the cockpit of the aircraft. It is shown here in the form of a switch that can occupy two positions, one corresponding to the "safe" configuration of the system (functional devices disarmed, reference number 10) and the other to the "armed" configuration of the latter (functional devices armed, reference number 11).

The control 9 is therefore designed to make it possible, on the ground and in flight and when the aircraft is powered up, to control the centralized transition between the "safe" and "armed" configurations from the cockpit. This control acts on two independent channels 12 and 13. The control channel 12 preferably managed by the aircraft onboard computer, travels through an AND function block 14 that authorizes the transfer of the instruction for transition between the two configurations depending mainly on a signal for detecting the aircraft on the ground applied to a terminal 15. The instructions thus generated are injected collectively onto the control lines 3a to 3n.

The control channel 13 preferably managed by wired logic makes it possible to consolidate the instructions of channel 12. The instructions corresponding to this channel 13 are generated, as a function of certain authorization criteria (identity of the person authorized to operate this control, for example) determined by a logic block 16, and injected onto the command and control lines 4a to 4n.

The fact that the safety system according to the invention has two independent centralized control channels offers a level of security complying with the objectives that ensure that an inadvertent control requires at least the failure of two independent items of equipment.

It should be noted that the "safe" and "arm" configurations may always be obtained on the ground by the service personnel at each functional device, DF1 to DFn, thanks to the manual controls 5a to 5n and 7a to 7n respectively.

Each electric disconnection device 2a to 2n and each mechanical blocking device 6a to 6n comprises a state indicator, 17a to 17n and 18a to 18n respectively, making it possible to view the state of the corresponding device. This indicator is preferably two-colored, for example red for the armed state "arm" and green for the unarmed state "safe". Each indicator is placed so that it can be clearly seen by the service personnel in its immediate vicinity. They are functional and visible in the absence of any electric power supply of the aircraft and preferably coupled mechanically to the respective levers 5a to 5n and 7a to 7n.

The safety system also comprises centralized viewing means 20. They are placed in the cockpit and make it possible to observe, in flight and on the ground when the aircraft is powered up, the various configurations of the functional devices DF1 to DFn. Preferably, each of the latter is associated with an individual indicator lamp 21a to 21n. These indicators are supplied respectively by control lines 22a to 22n that link them to the electric disconnection devices 2a to 2n.

The centralized viewing means 20 also comprise a collective device for displaying the state of all the functional devices DF1 to DFn. This collective display device comprises an AND function logic block 23 whose inputs are connected to state control lines 24a to 24n connected to the respective disconnection devices 2a to 2n. The AND function block 23 is connected to an indicator lamp 25 placed in the cockpit and reporting the collective state of all the functional devices DF1 to DFn.

Figure 4:
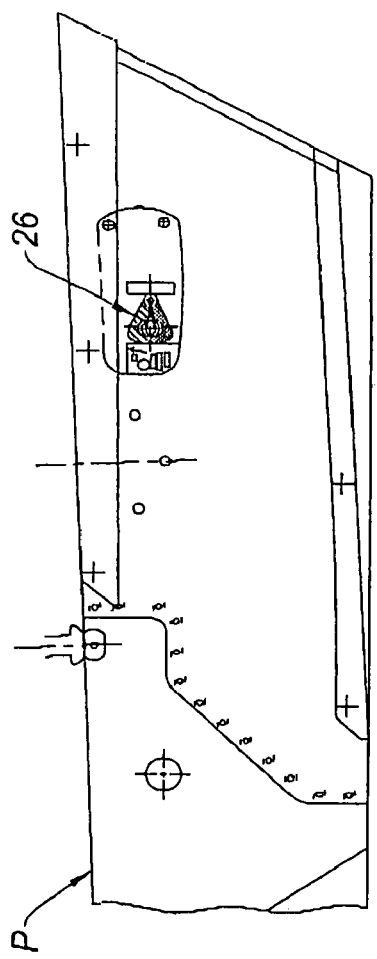
FIG. 4 is an external view of a functional device showing the means for viewing the armed or disarmed states of an electric safety barrier incorporated into this functional device.
Figure 5:
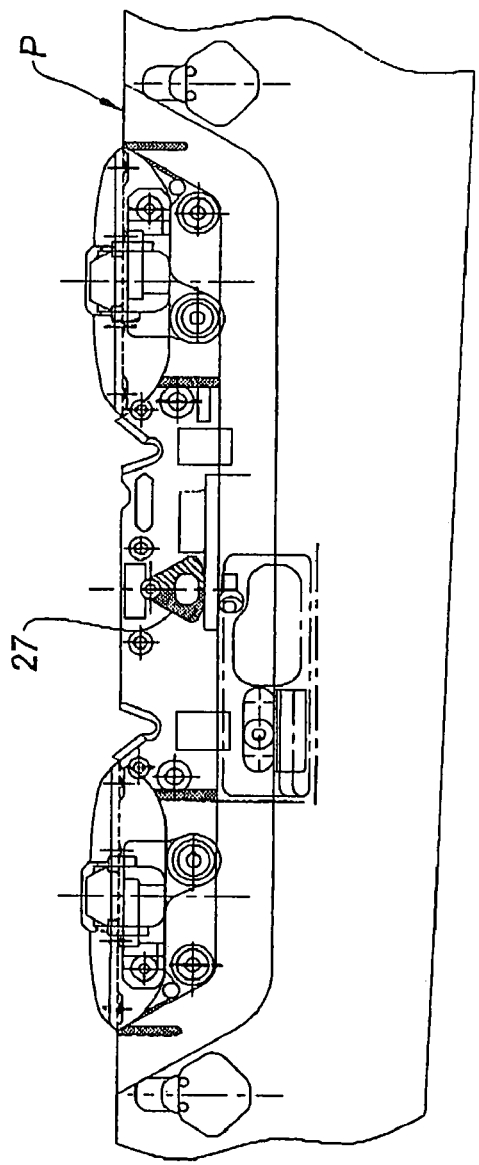
FIG. 5 is an external view of a functional device showing the means for viewing the armed and disarmed states of a mechanical safety barrier incorporated into this functional device.

FIG. 4 shows, as an example, the location on a pylon P of a combat aircraft of the state indicator 26 corresponding to the indicators 17a to 17n of the electric disconnection devices 2a to 2n of FIG. 3. In this case, it is a two-color (red or green for example) viewing window associated with the manual control lever represented as 5a to 5n in FIG. 3. An example of the installation of a state indicator 27 can be seen in FIG. 5 as concerns the mechanical blocking device of a payload ejector.

In this case also the indicator has a two-color viewing window associated with the manual operating lever of the type represented as 7a to 7n in FIG. 3.

The invention being thus described, it will be apparent that the same may be varied in many ways. Such variations are not to be regarded as a departure from the spirit and scope of the invention, and all such modifications as would be recognized by one skilled in the art are intended to be included within the scope of the following claims.

There is claimed:

1. A safety system for an aircraft provided with at least one functional device using primary energy, each functional device comprising at least a first removable barrier making it possible to arm and disarm the functional device depending on whether the aircraft is in flight or on the ground, said first removable barrier being electrically operated, at least a second removable barrier including an electrically operated mechanical blocking device blocking the kinematics of the functional device when the primary energy is triggered, and a control mechanism placed inside the aircraft and accessible from the cockpit, said control mechanism enabling cockpit personnel to electrically switch said first and second barriers between their armed and disarmed positions, wherein each removable barrier includes a visual indicator for the visual indication of said removable barrier's armed and disarmed states.

2. The safety system as claimed in claim 1, wherein said first removable barrier includes an electrically operated device for electrically disconnecting a signal that makes it possible to release the primary energy of the functional device.

3. The safety system as claimed in claim 1, wherein said first and second removable barriers also include manual operating mechanisms for arming or disarming the functional device without actuating electrical operation of said barriers.

4. The safety system as claimed in claim 1, wherein said control mechanism includes two independent control channels for said removable barriers, said first control channel being arranged to allow the arming or disarming of said functional device as a function of a signal of presence on the ground of said aircraft and said second control channel being arranged to allow the arming and disarming of said functional device as a function of predetermined criteria, independent of those of the first channel and consolidating the instructions of the first channel.

5. The safety system as claimed in claim 1 for an aircraft wherein said functional device includes a plurality of functional devices using primary energy, wherein said control mechanism is centralized in the cockpit of the aircraft and includes a single electric control member allowing the collective arming or disarming of said plurality of functional devices of the aircraft.

6. The safety system as claimed in claim 5, wherein a viewing device is provided close to said single control member to provide a visual report of the armed and disarmed states of said functional devices.

7. The safety system as claimed in claim 6, wherein said viewing device includes as many indicator lamps as there are functional devices in the aircraft to report individually on their armed and disarmed states.

8. The safety system as claimed in claim 6, wherein the armed and disarmed states of said plurality of functional devices are applied to an AND function block connected to a single indicator lamp in order to be able to report collectively the armed and disarmed states of said plurality of functional devices.

* * * * *